United States Patent
Miner et al.

(10) Patent No.: US 9,365,220 B2
(45) Date of Patent: Jun. 14, 2016

(54) AIR HOSE HANGER FOR A RAIL WAY VEHICLE

(71) Applicant: A. Stucki Co., Moon Township, PA (US)

(72) Inventors: Scott D. Miner, Pittsburgh, PA (US);
Victoria K. Livingston, Bethel Park, PA (US); James S. Kennedy, Zelienople, PA (US)

(73) Assignee: A. Stucki Co., Moon Township, PA (US)

( * ) Notice: Subject to any disclaimer, the term of this patent is extended or adjusted under 35 U.S.C. 154(b) by 152 days.

(21) Appl. No.: 14/154,401

(22) Filed: Jan. 14, 2014

(65) Prior Publication Data

US 2015/0197258 A1 Jul. 16, 2015

(51) Int. Cl.
*F16L 3/00* (2006.01)
*B61G 5/06* (2006.01)
*F16L 3/01* (2006.01)

(52) U.S. Cl.
CPC . *B61G 5/06* (2013.01); *F16L 3/003* (2013.01); *F16L 3/01* (2013.01)

(58) Field of Classification Search
USPC ....... 248/53, 49, 58, 60, 61, 75; 213/75 R, 76
See application file for complete search history.

(56) References Cited

U.S. PATENT DOCUMENTS

| | | | |
|---|---|---|---|
| 3,587,868 A | 6/1971 | Yates | |
| 3,592,425 A * | 7/1971 | Randolph et al. | 248/53 |
| 4,986,500 A * | 1/1991 | Campbell | 248/53 |
| D583,652 S | 12/2008 | Vermesi et al. | |
| 7,631,774 B2 * | 12/2009 | Foxx et al. | 213/76 |
| 7,637,381 B2 | 12/2009 | Foxx et al. | |
| 7,757,995 B2 * | 7/2010 | McKiernan | 248/53 |
| 7,780,022 B2 | 8/2010 | Vermesi et al. | |
| 8,167,251 B2 * | 5/2012 | Murphy et al. | 248/53 |
| 8,276,853 B2 * | 10/2012 | Murphy | 248/53 |

* cited by examiner

*Primary Examiner* — Steven Marsh
(74) *Attorney, Agent, or Firm* — Buchanan Ingersoll & Rooney PC

(57) ABSTRACT

An air hose hanger for supporting flexible air hoses of a trainline braking system of a rail car includes a head including a mounting plate for mounting the hanger to a coupler of a rail car, the mounting plate including first and second apertures for receiving first and second bolts for attaching the mounting plate to the coupler, and an arm removably attached to the head. The arm includes a first arm removably attached to the head extending in a substantially vertical direction away from the head, and a second arm integral with the first arm and extending in a horizontal direction substantially parallel to an axis of the coupler. The head is attached to the coupler at three preformed holes formed in the coupler, the three preformed holes including two lightener holes preformed in the coupler, and an aperture preformed in a tab on an underside of the coupler.

15 Claims, 8 Drawing Sheets

AIR HOSE HANGER FOR A RAIL WAY VEHICLE

FIELD OF THE INVENTION

The present invention is directed generally towards hangers/couplers for supporting flexible air (i.e., brake) hoses between adjacent rail cars and, in particular, towards hangers/couplers for supporting flexible air (i.e., brake) hoses between adjacent rail cars known as "cushioned cars" which include cushioned couplers for shock absorption.

BACKGROUND OF THE INVENTION

A brake system for a rail car, and preferably a cushioned car, generally includes a pipe which is attached to the rail car, and which pipe terminates in a valve at the end of the rail car. The valve is connected to a flexible hose which connects to a flexible hose on an adjacent car via a glad hand to connect the brake line pipe of adjacent cars together for proper operation of the braking system. The flexible hose on each car is supported by a hanger bracket, which is designed to maintain the hose a specified distance from the ground. Typically, this distance is set by Association of American Railroads ("AAR") standards. Such a connection permits the rail cars (in addition to the flexible hoses) to be readily connected to, and disconnected from, each other. Further, the flexible nature of the hose helps support the brake system through turns when the axes of the rail cars are angled with respect to one another.

However, a problem with cushioned couplers (used extensively on autorack train cars—i.e., cushioned cars) is the issue of needing brake hose supports that will move in tandem with the couplers to hold up hose slack while preventing air hose separations at the glad hand connections. It is estimated that air hose separation is one of the largest causes of train stoppage for cushioned cars. Additionally, the AAR standard distance from the trainline support casting to the end of the coupler, as well as the distance of the air hose above the ground, also need to be maintained.

Since the geometries of the various rail cars differ, it is difficult to provide a hanger/coupler that will maintain the above-identified distances for the various rail cars.

The present invention is directed toward overcoming one or more of the above-mentioned problems.

SUMMARY OF THE INVENTION

The air hose hanger of the present invention is designed for applications in the rail industry, specifically dealing with long-travel, cushioned couplers (which are used extensively on autorack train cars, also referred to as "cushioned cars"), and the issue of needing brake hose supports that will move in tandem with the couplers to hold up hose slack while preventing air hose separations at the glad hand connections. The inventive air hose hanger is designed to mount to the area of the coupler head that includes the lightener holes. The inventive air hose hanger includes an arm that will extend a certain distance downward and toward the centerline of the rail car in a plane generally perpendicular to the longitudinal center plane of the car. The arm then turns and extends down the centerline of the rail car away from the coupler head a predetermined distance. At the end of the arm, a hose connection is provided which suspends the air hose above the track/ground (e.g., at a distance within AAR standards). The hose connection is allowed to rotate 360°. Once the air hose is connected thereto, the hose connection will rotate, or swivel, to accommodate the taking up and letting out of slack in the semi-rigid (yet still flexible) rubber air hose as the coupler moves in and out, or as the cars move through curves, causing the couplers to angle with respect to each other. Rotation of the hose connection will be limited by the air hose itself. This rotation, or swiveling, will also isolate the glad hand connections from any forces on the hose itself, as they will be transferred into the hose connection at the end of the arm extension, which is not susceptible to hose separation issues.

The inventive air hose hanger includes a bolt-on, or otherwise attached, head which will mount directly to the coupler, and an arm extension which will bolt, or otherwise attach, to the head. The arm extension and the head are in separate pieces to account for different coupler types (e.g., E, F, etc.), as well as to allow the arm extension to be interchangeable between bolt-on type mounting heads and/or a welded-on mounting head, depending on customer preference or specific/unique applications. Thus, the air hose hanger of the present invention has the advantage in that it can be used on a different variety of rail cars with different geometries by simply changing the head mounting design coupler. This allows the arm extension to be used with different head designs to be able to attach to the different types of couplers.

In one embodiment, the method by which the bolt-on head mounts to the coupler relies on exploiting a feature of all couplers, namely, the lightener holes (named as such because they reduce the total casting weight of the coupler by removing material therefrom in an area of the coupler where it is typically not needed). The lightener holes are thru-holes extending into the coupler, and span from the front to the rear of the coupler. The lightener holes have a larger opening at the front end of the coupler head than at the rear end of the coupler head. This change in the size of the lightener hole allows inserts to be used which can pass through the front lightener hole opening, but cannot pass through the rear lightener hole opening. Since two lightener holes are typically provided in the coupler, it is contemplated to utilize two inserts. The inserts can have a single threaded hole in the center of them that will allow them to receive a bolt from the bolt-on head and act as a solid connector therefore.

The bolt-on head of the inventive air hose hanger can also take advantage of a third mounting point to ensure correct orientation. This third mounting point is a small tab with a hole in it formed on the underside of the coupler, which tab/hole is normally used to attach a rubber, stretchy air hose hanger with S-hooks, much like a bungee cord. The bolt-on head of the inventive air hose hanger includes a small "thumb-like" extension that extends down from the head and outward to the tab on the coupler to allow a single bolt to secure the thumb-like extension to the tab on the coupler. All three of the connection points of the bolt-on head (e.g., at the two lightener holes and at the thumb-like extension) can be considered solid connections, meaning that with proper securement and using common unthreading prevention methods (e.g., cotter pins, bolt-locking tabs, etc.) the head will not come off or come loose due to vibration or shock forces, as well as normal operating forces.

In accordance with one aspect of the present invention, an air hose hanger for supporting flexible air hoses of a trainline braking system of a rail car is provided. The air hose hanger includes a head including a mounting plate for mounting the air hose hanger to a coupler of a rail car, the mounting plate including first and second apertures for receiving first and second bolts for attaching the mounting plate to the coupler, and an arm removably attached to the head. The arm includes a first arm removably attached to the head and extending in a substantially vertical direction away from the head, and a second arm integral with the first arm and extending in a horizontal direction substantially parallel to an axis of the coupler. The air hose hanger further includes first and second inserts received in first and second lightener holes which are preformed in the coupler, the first and second lightener holes extending from a front opening in the coupler to a rear opening in the coupler, wherein the front opening is larger than the rear opening, and wherein the first and second inserts are sized such that they are received in the front opening and are displaceable in the first and second lightener holes, but are larger than the rear openings such that they cannot pass there through, and wherein the first and second inserts are disposed in the lightener holes adjacent the rear openings and each include a threaded aperture for receiving the first and second bolts, respectively, for securing the head of the hanger to the coupler.

In one form, a hose connection is rotatably attached to an end of the second arm for rotatably supporting a flexible air hose attached to the hose connection.

In another form, the end of the second arm includes a hollow cylindrical member configured for receiving a cylindrical member of the hose connection, wherein the cylindrical member of the hose connection is attached to the hollow cylindrical member for rotatable movement of the hose connection with respect to the hollow cylindrical member.

In a further form, an extension extends from the head in a direction generally away from the second arm, the extension including an aperture configured for alignment with an aperture preformed in an underside of the coupler and attached to the coupler via a bolt passing through both apertures.

The arm can include a "+" or "x" shaped cross-section. Further, the rail car can include a cushioned car and, accordingly, the coupler can include a cushioned coupler.

While various materials can be used for the head and the arm, in a preferred form the head and arm can be made from, for example, ductile iron, heat treated ductile iron, or austempered ductile iron or steel for weldable designs.

In accordance with another aspect of the present invention, an air hose hanger for supporting flexible air hoses of a trainline braking system of a rail car is provided. The air hose hanger includes a head including a mounting plate for mounting the air hose hanger to a coupler of a rail car, the mounting plate including first and second apertures for receiving first and second bolts for attaching the mounting plate to the coupler, and an arm removably attached to the head. The arm includes a first arm removably attached to the head and extending in a substantially vertical direction away from the head, and a second arm integral with the first arm and extending in a horizontal direction substantially parallel to an axis of the coupler. The head is attached to the coupler at three preformed holes formed in the coupler, the three preformed holes comprised of first and second lightener holes preformed in the coupler, and a third aperture preformed in a tab on an underside of the coupler.

In one form, the air hose hanger further includes first and second inserts received in the first and second lightener holes which are preformed in the coupler, the first and second lightener holes extending from a front opening in the coupler to a rear opening in the coupler. The front opening is larger than the rear opening, and the first and second inserts are sized such that they are received in the front opening and are displaceable in the first and second lightener holes, but are larger than the rear openings such that they cannot pass there through. The first and second inserts are disposed in the lightener holes adjacent the rear openings and each include a threaded aperture for receiving the first and second bolts, respectively, for securing the head of the hanger to the coupler.

In another form, the air hose hanger further includes an extension extending from the head in a direction generally away from the second arm, the extension including an aperture configured for alignment with the third aperture preformed in the underside of the coupler and attached to the coupler via a bolt passing through both apertures.

In a further form, the air hose hanger further includes a hose connection rotatably attached to an end of the second arm for rotatably supporting a flexible air hose attached to the hose connection.

In yet a further form, the end of the second arm includes a hollow cylindrical member configured for receiving a cylindrical member of the hose connection, wherein the cylindrical member of the hose connection is attached to the hollow cylindrical member for rotatable movement of the hose connection with respect to the hollow cylindrical member.

The arm can include a "+" or "x" shaped cross-section. Further, the rail car can include a cushioned car and, accordingly, the coupler can include a cushioned coupler.

While various materials can be used for the head and the arm, in a preferred form the head and arm can be made from, for example, ductile iron, heat treated ductile iron, or austempered ductile iron or steel for weldable designs.

While the head and arm are described herein in the form of a two-piece design, it should be appreciated that a one-piece design is also contemplated where the head and arm are integral with each other.

It is an object of the present invention to provide an air hose hanger that solidly connects to a coupler using connections inherent to a typical coupler.

It is a further object of the present invention to provide a universal air hose hanger that may be utilized with rail cars of different geometries.

It is yet a further object of the present invention to provide a two-piece air hose hanger consisting of a head and arm extension, which allows for different arm extensions to be utilized with the same head to account for different geometries of rail cars.

It is still a further object of the present invention to provide an air hose hanger that exploits common features of couplers for each of installation.

Other objects, aspects and advantages of the present invention can be obtained from a study of the specification, the drawings, and the appended claims.

BRIEF DESCRIPTION OF THE DRAWINGS

Various features, details and advantages of the present invention arise from the following description in which different exemplary embodiments are illustrated in more detail by means of the attached drawings. In the figures.

DETAILED DESCRIPTION OF THE INVENTION

Figure 1:
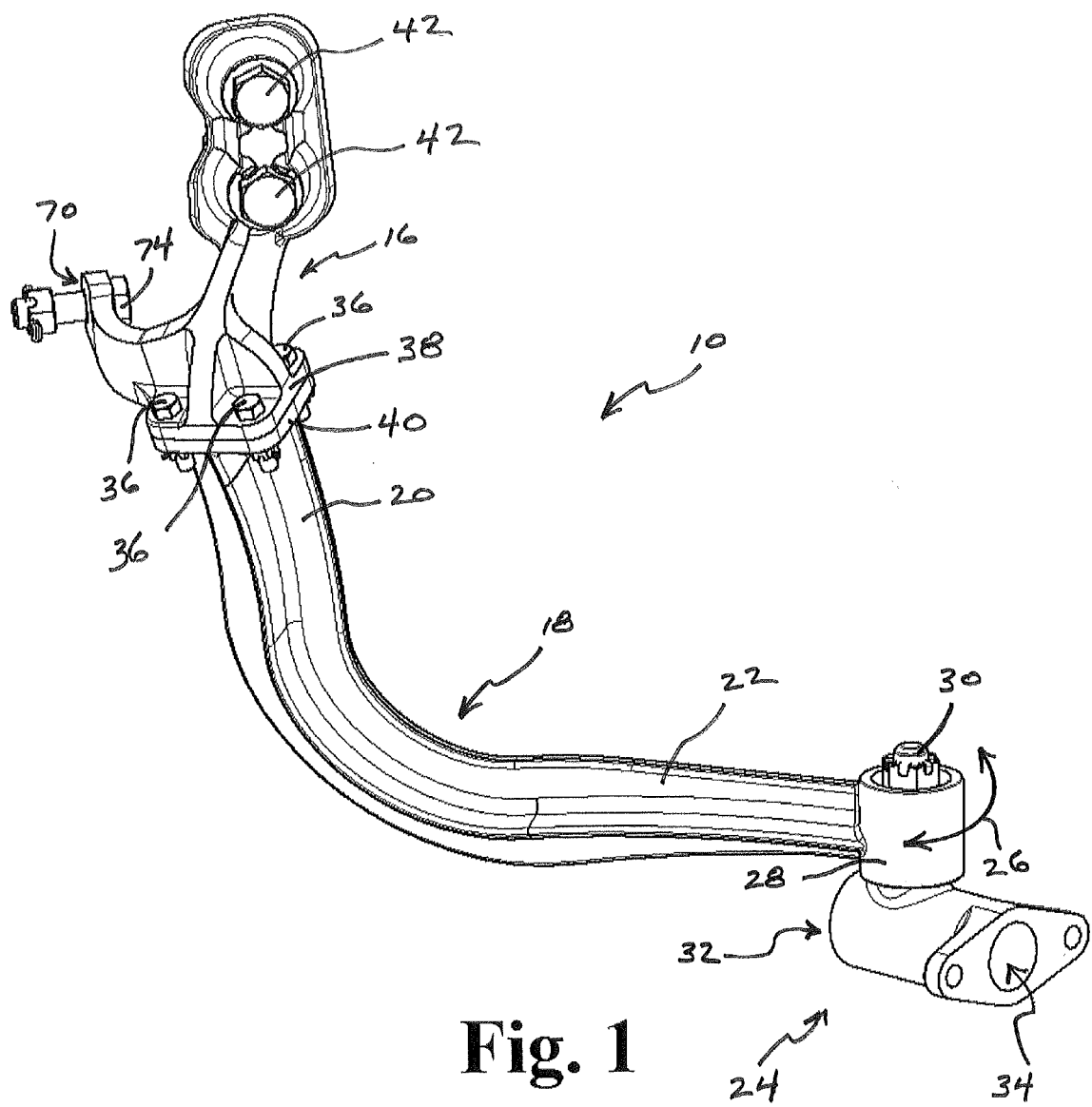
FIG. 1 is a perspective view of an air hose hanger in accordance with the present invention.
Figure 2:
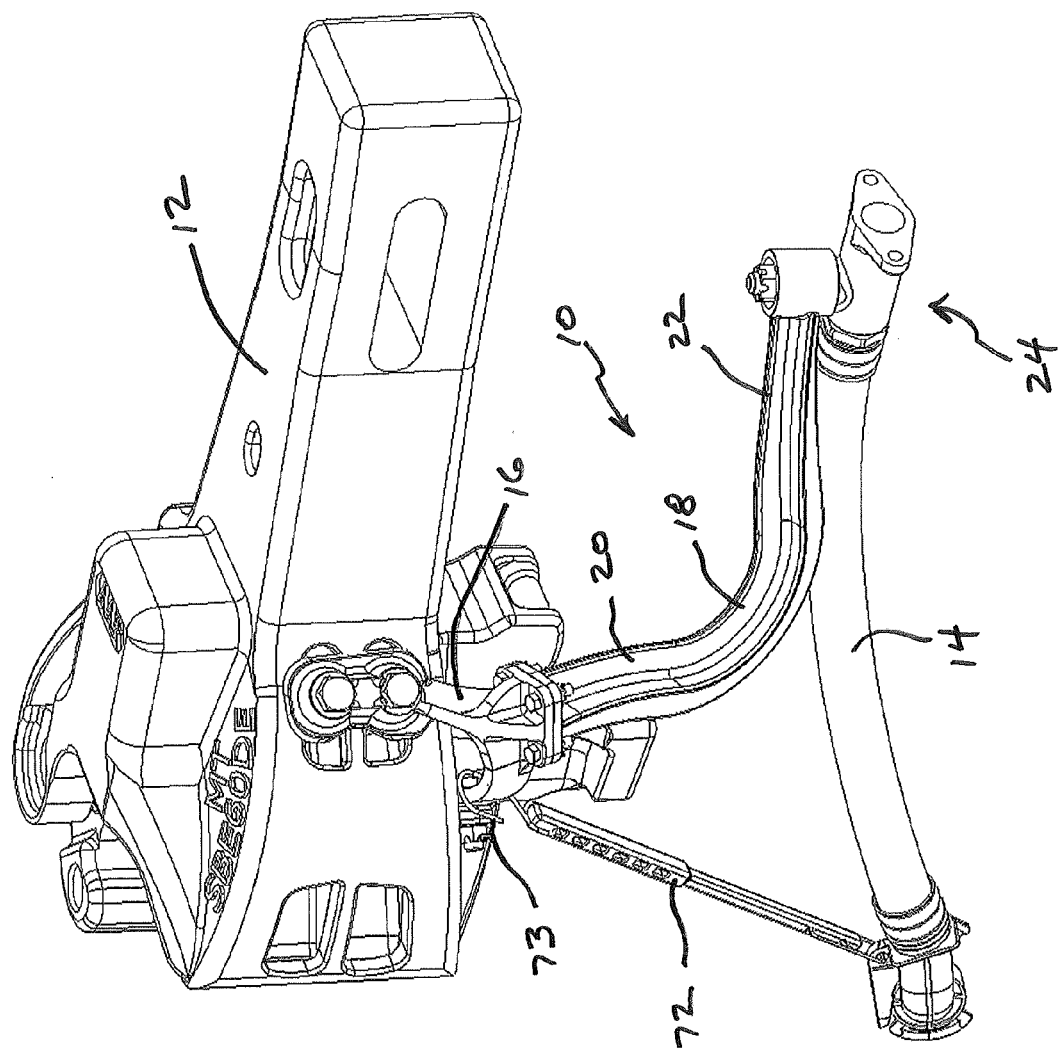
FIG. 2 is a perspective view of an air hose hanger in accordance with the present invention connected to a rail car coupler and having a flexible air (i.e., brake) hose connected thereto.
Figure 3:
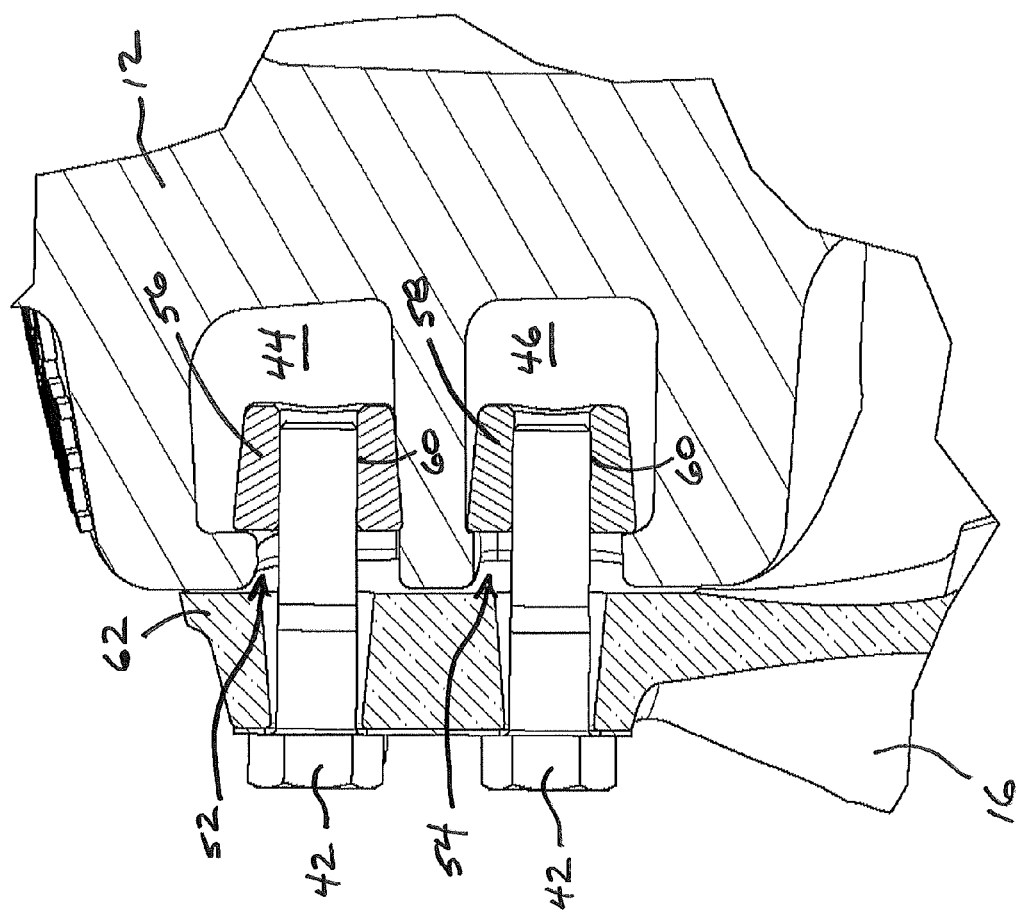
FIG. 3 is a cross-sectional detailed view showing inserts provided in the lightener holes in the coupler for attachment of the air hose hanger head thereto taken along line 3-3 in FIG. 4.
Figure 7:
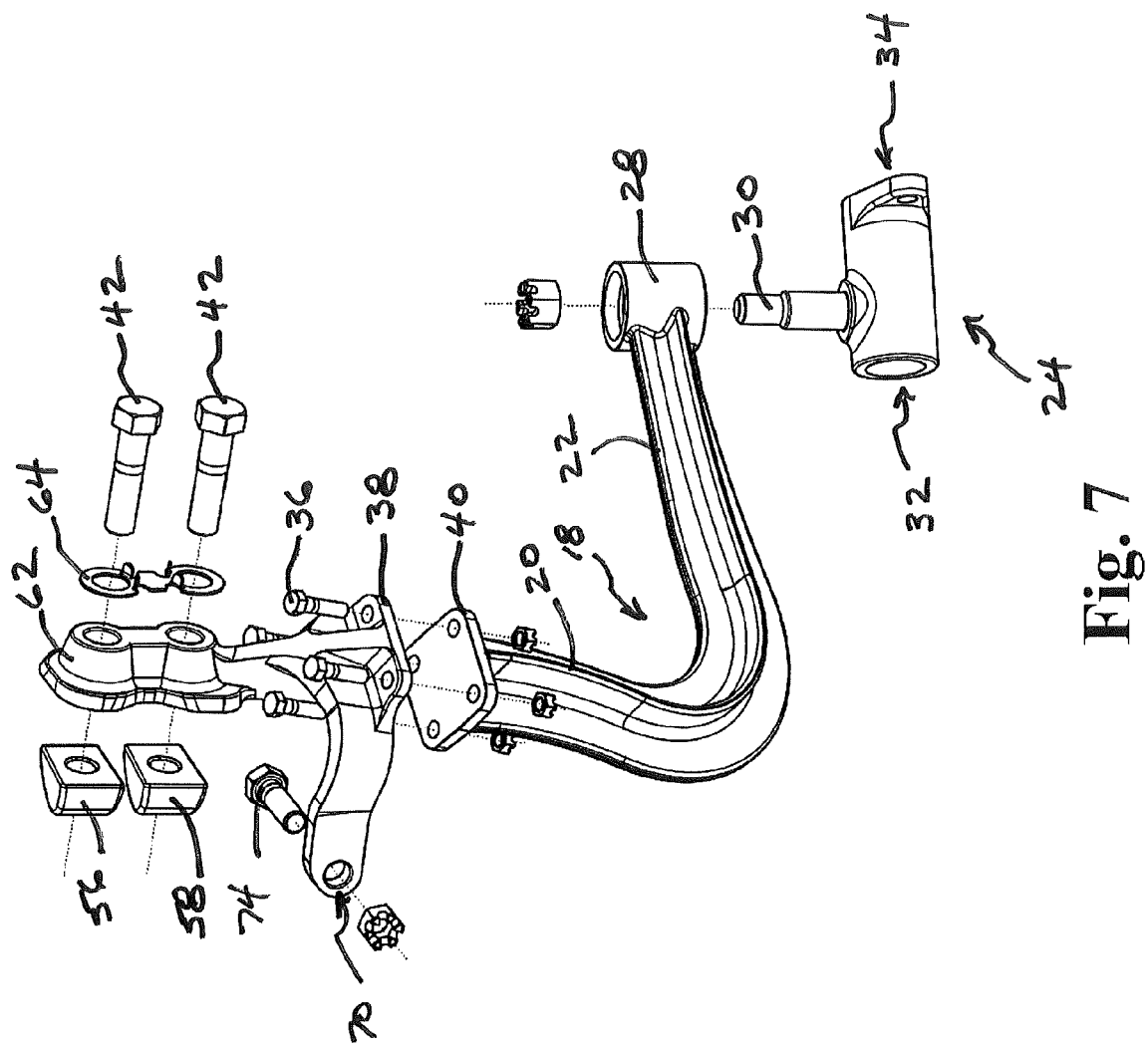
FIG. 7 is an exploded perspective view of the inventive air hose hanger.

As shown in FIGS. 1-2 and 7, an air hose hanger in accordance with the present invention is shown at 10. The air hose hanger is designed to be mounted to a rail car coupler 12 and rotatably support the flexible air/brake hose 14 connected between the rail cars as part of the train brake system, as will be described in more detail hereafter. As shown and described herein, the air hose hanger 10 is of a two-piece construction, and includes a head portion, or head, 16 having an arm extension, or arm, 18 extending therefrom. The arm 18 includes two portions, or arms, extending approximately 90° relative to each other such that the arm 18 is substantially "L" shaped. With the hanger 10 attached to the rail way coupler 12 (see e.g., FIG. 2), the arm 18 includes a first arm 20 that extends a certain distance downward and toward the centerline of the rail car (not shown) in a plane perpendicular to the longitudinal center plain of the rail car, and a second arm 22 that extends down the centerline of the rail car away from the coupler head a certain distance. As previously noted, the first 20 and second 22 arms are approximately 90° apart such that the arm 18 is substantially "L" shaped.

It is contemplated herein that the head 16 and arm 18 can be made of, for example, ductile iron, heat treated ductile iron, or austempered ductile iron or steel for weldable designs. However, one skilled in the art will appreciate that other materials may be used without departing from the spirit and scope of the present invention. One skilled in the art will further appreciate that while the head 16 and arm 18 are described herein in the form of a two-piece design, one-piece design is also contemplated where the head 16 and arm 18 are integral with each other, without departing from the spirit and scope of the present invention.

At the end of the arm 18 (specifically second arm 22), a hose connection 24 is provided for suspending the air (brake) hose 14 above the track and allowing the hose 14 to swivel, or rotate, (see arrow 26 in FIGS. 1 and 8) to accommodate the taking up and letting out of slack in the semi-rigid, yet still flexible, air hose 14 as the coupler 12 moves in and out. When the coupler 12 is installed in a rail car, it will generally move in front and back directions as well as left to right directions around turns. The hose connection 24 will rotate to accommodate for the slack in the coupling system.

Figure 8:
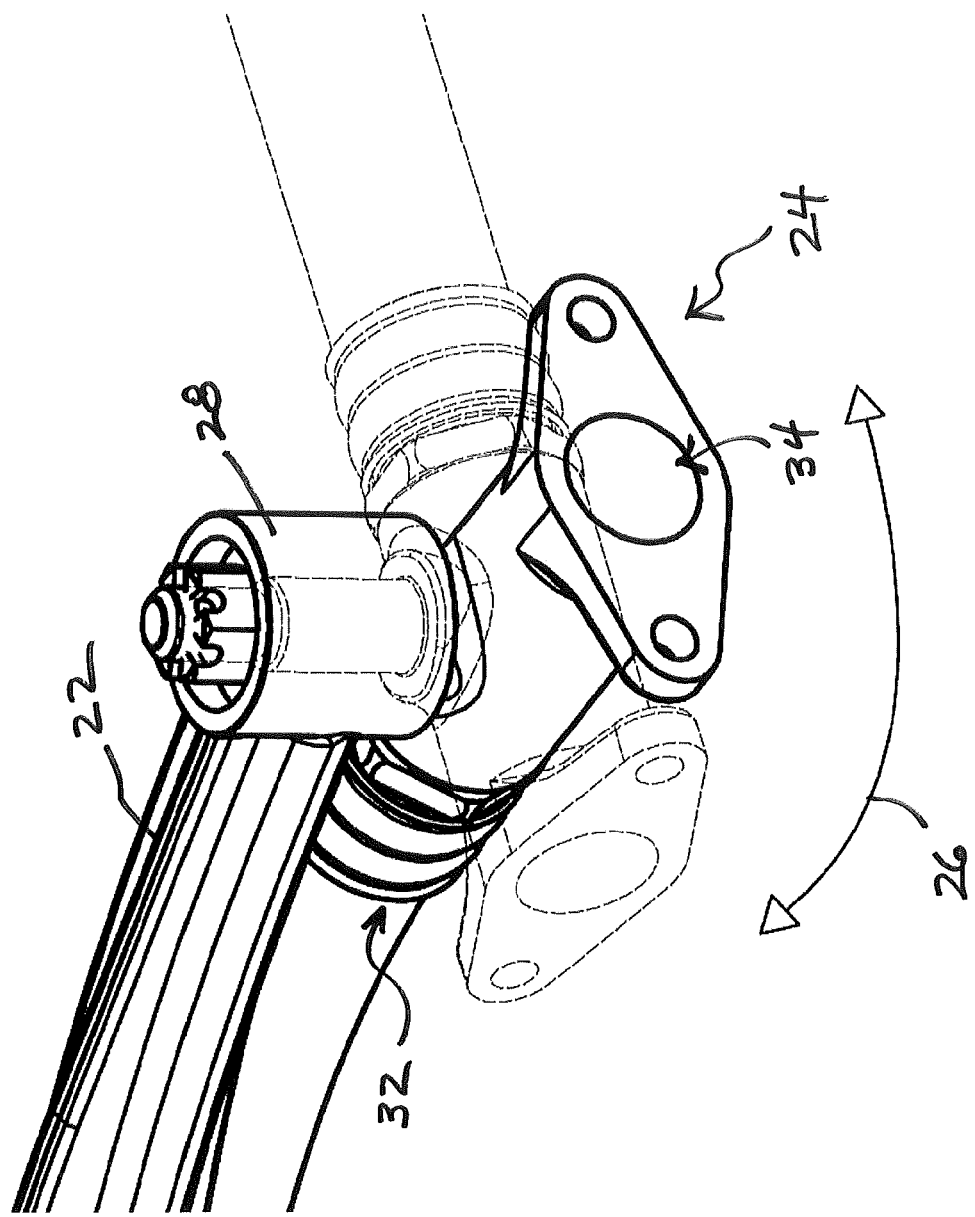
FIG. 8 is a perspective view illustrating rotation of the hose connection.

Specifically, as shown in FIGS. 1-2 and 8, the end of the second arm 22 includes a hollow cylindrical member 28 which receives a cooperating cylindrical member 30 of the hose connection 24. A cotter pin (not shown) is extended through the top portion of the cylindrical member 30 to maintain the rotational relationship of cylindrical members 28 and 30 (see arrow 26 in FIGS. 1 and 8), as will be appreciated by one skilled in the art. Further, the angle of rotation of the hose connection 24 may be adjusted to be limited, or may rotate freely 360° and be limited by the air hose itself, as will be appreciated by one skilled in the art.

The hose connection 24 generally includes a first threaded aperture 32 which is connected to the air (brake) hose 14 (see FIGS. 1-2 and 8) and generally faces away from the rail car body when the hanger 10 is connected to the coupler 12. A flanged aperture 34 is opposite, and in communication with, the threaded aperture 32, and is also typically threaded. The flanged aperture 34 connects a flexible air (brake) hose between the hanger 10 and the angle cock valve (not shown) on the rail car body.

The head 16 is connected to the arm extension 18 via bolts 36 which extend through cooperating connector plates 38, 40 formed on the end of the head 16 and the arm extension (specifically first arm 20), respectively, and are fastened, for example, using lock nuts or other fastening means. The head 16 is connected to the rail way coupler via two bolts 42 which are connected to inserts provided in the lightener holes of the rail way coupler 12, as will be described hereafter. Providing the hanger 10 in a two-piece construction (head 16 and arm 18) allows the hanger to be used with different coupler types (e.g., E, F, etc.) by simply changing the head mounting design coupler. This allows the arm extension to be used with different head designs to be able to attach to the different types of couplers. Additionally, should the arm 18 or the hose connection 24 become damaged, they can be readily replaced without having to remove the entire hanger 10 from the coupler, resulting in cost savings in maintenance operations.

As shown in FIGS. 1-2 and 7, the arm 18 has a generally "+" or "x" shaped cross-section. Such a cross-section adds strength to the arm 18 against lateral and/or longitudinal forces, and helps to facilitate connection of the arm 18 to the head 16 via the bolts 36 and connector plates 40, 38, respectively. For ease of connection, the head 16 also has a generally "+" or "x" shaped cross-section at an area directly adjacent the connector plate 38. However, one skilled in the art will appreciate that the cross-section of the arm 18 (and also the head 16 in general and directly adjacent the connector plate 38) is/are not critical to the present invention, and the arm 18 (and head 16) may have any cross-sectional shape without departing from the spirit and scope of the present invention.

Referring to FIGS. 2-4 and 6, the head 16 of the hanger 10 is connected to the coupler 12 utilizing the lightener holes provided in the coupler 12. As previously noted, the lightener holes are provided in the coupler 12 to reduce the total casting weight of the coupler 12 by removing material from the coupler 12 where it is generally not needed. As shown in FIGS. 2-4 and 6, the lightener holes generally include an upper lightener hole 44 and a lower lightener hole 46. The upper and lower lightener holes 44, 46 extend into the coupler 12 from a front opening 48, 50 to a rear opening 52, 54, respectively. The front opening 48, 50 is generally larger than the rear opening 52, 54.

Inserts 56 and 58 are inserted into the lightener holes 44 and 46 at the front openings 48 and 50 thereof, respectively. The inserts 56, 58 are sized such that they are smaller than the front openings 48, 50, but larger than the rear openings 52, 54. The inserts 56, 58 are inserted in the front openings 48, 50 and moved through lightener holes 44, 46 in the direction of dotted arrows (see FIGS. 4 and 6) until they sit adjacent the rear openings 52, 54. Since the inserts 56, 58 are larger than the rear openings 52, 54, they will not pass through the rear openings 52, 54.

Figure 4:
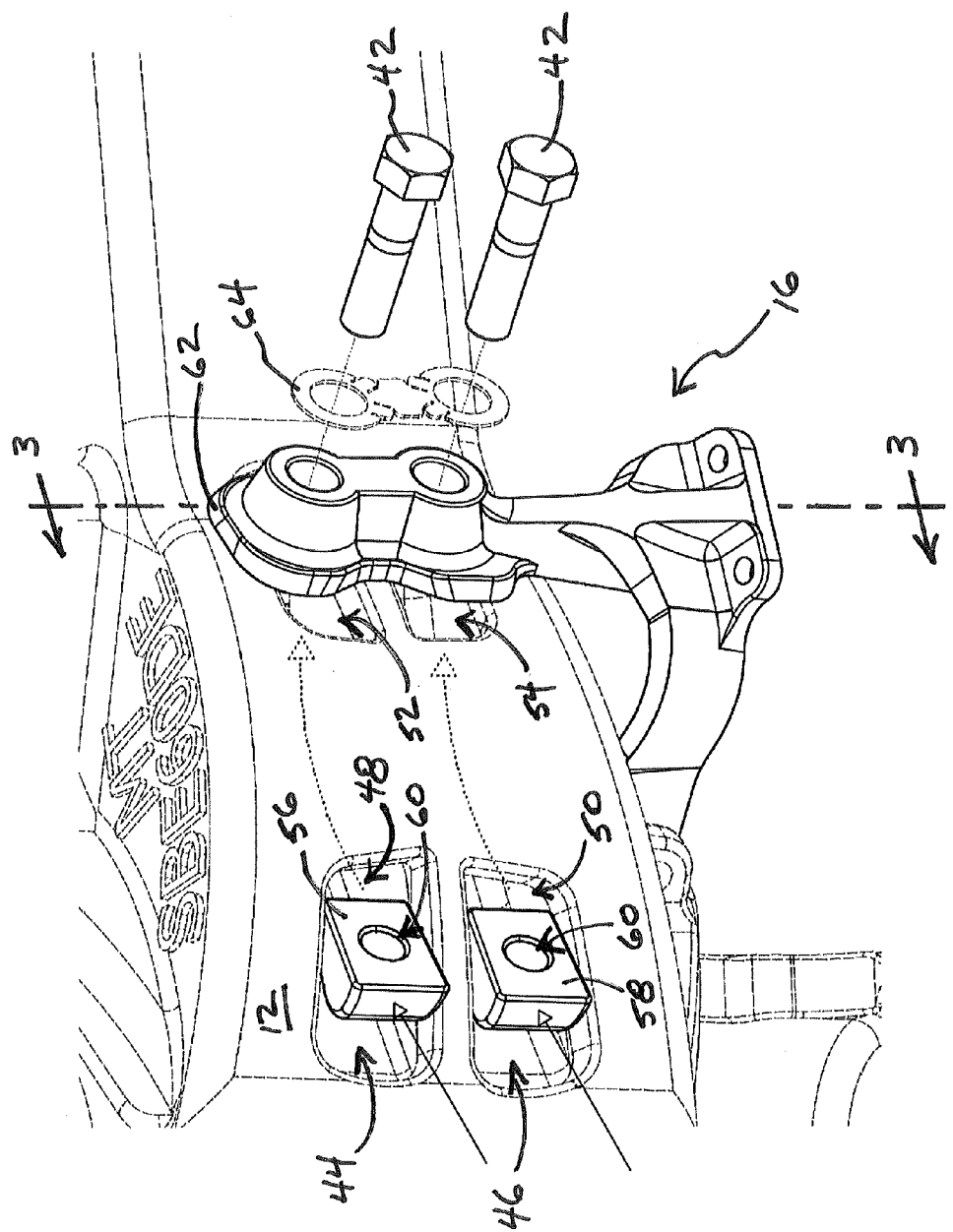
FIG. 4 is a sectional detailed view illustrating the head of the inventive air hose hanger mounted to a rail car coupler.
Figure 5:
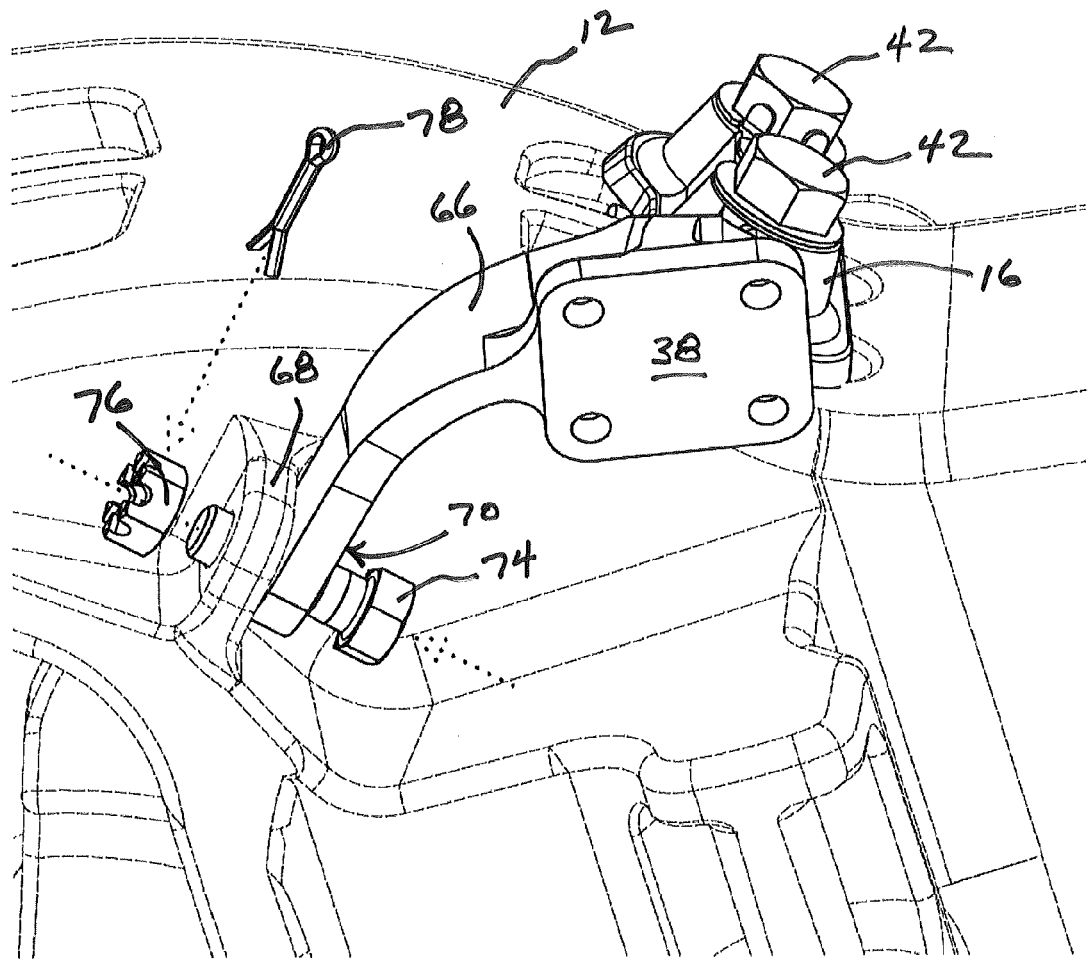
FIG. 5 is a perspective detailed view showing the third connection point of the inventive air hose hanger to the rail car coupler.
Figure 6:
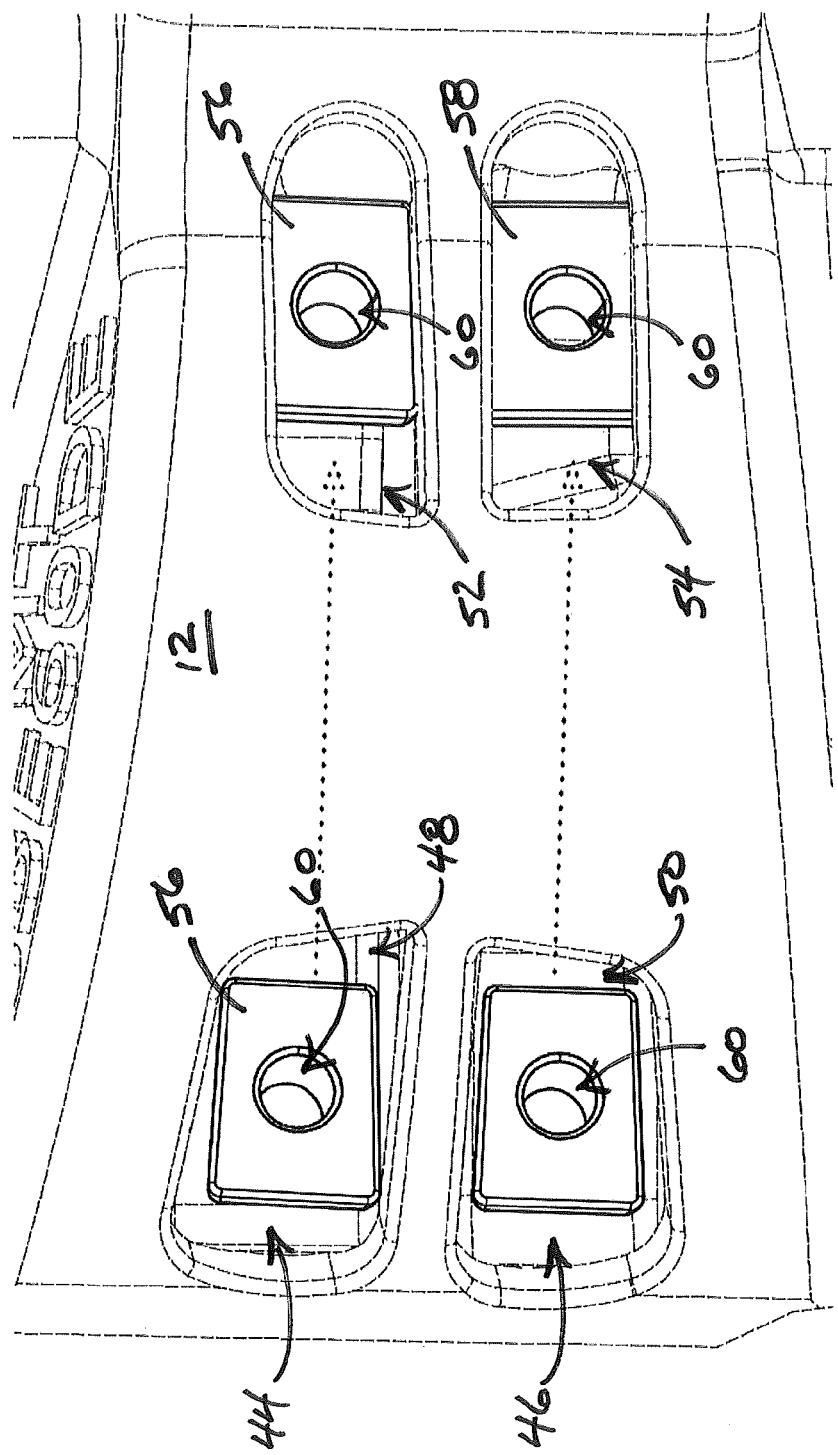
FIG. 6 is a perspective detailed view showing inserts provided in the lightener holes in the coupler for attachment of the air hose hanger head thereto.

The inserts 56, 58 include threaded apertures 60 formed therein. Preferably, the threaded apertures 60 are centered, but may be placed at any convenient point on the inserts 56, 58. The inserts 56, 58 are aligned with the rear openings 52, 54 and the bolts 42 pass through corresponding apertures formed in a mounting plate 62 of the head 16 and are threaded into the apertures 60 formed in the inserts 56, 58. The bolts 42 are tightened to pull the inserts 56, 58 up against the edges of the coupler 12 that define the rear openings 52, 54 to fasten the head 16, and thus the hanger 10, securely to the coupler 12. By using the lightener holes 44, 46 that are already formed in the coupler 12, no additional holes or fastening means need formed in the coupler 12. Additionally, FIGS. 4 and 7 show a lock washer 64 utilized in securing the bolts 42 to the inserts 56, 58. However, the lock washer 64 may be omitted.

Referring to FIGS. 1-2, 5 and 7, to provide added stability and securement of the hanger 10 to the coupler 12, a third connection point on the coupler 12 is used to fasten the hanger 10 thereto. In this regard, the head 16 includes an extension (e.g., a thumb-like extension) 66 which extends from the head 16 in a direction generally away from the rail car body. This third connection point attaches to a small tab 68 generally provided on the underside of the coupler 12 body, which tab 68 includes a hole for attaching an elastic air support hanger 72 with an S-hook 73 (see e.g., FIGS. 2 and 5), much like a bungee cord. The air support hanger 72 supports the air hose 14. The end of the extension 66 includes an aperture 70 which is aligned with the aperture in the tab 68 and secured with a bolt 74 extending there through. A lock nut 76 and cotter pin 78 (see FIG. 5) are shown for securing the bolt 74 in place; however, one skilled in the art will appreciate that any means of securing the bolt 74 to effectuate this third connection point may be implemented without departing from the spirit and scope of the present invention. Since the extension 66 is secured using the aperture in the tab 68 typically used for attaching the elastic air support hanger 72 with the S-hook 73, the extension 66 may include an additional aperture (not shown) to which the S-hook 73 may attach. Alternately, the S-hook 73 may hook over the extension 66 so that the air support hanger 72 may support the air hose 14 (see FIG. 2). The three connection points, namely the two lightener holes 44 and 46 and the tab 68, provide secure and stable connection of the hanger 10 to the coupler 12, such that the head 16 (and thus the hanger 10) will not come off or come loose due to vibration or shock forces, as well as normal operating forces.

While the present inventive hanger 10 has particular utility for use with cushioned cars having cushioned couplers that move in a horizontal plane, it should be understood that the inventive hanger 10 may be implemented and attached to any coupler to support the air hose. For example, the hanger 10 may be attached to a rail way coupler that does not move in a generally horizontal plane.

While the present invention has described herein with particular reference to the drawings, it should be understood that various modifications could be made without departing from the spirit and scope of the present invention. Those skilled in the art will appreciate that various other modifications and alterations could be developed in light of the overall teachings of the disclosure. The presently preferred embodiments described herein are meant to be illustrative only and not limiting as to the scope of the invention which is to be given the full breadth of the appended claims and any and all equivalents thereof. Additionally, the disclosure of a range of values is a disclosure of every numerical value within that range.

We claim:

1. An air hose hanger for supporting flexible air hoses of a trainline braking system of a rail car, the air hose hanger comprising:
    a head including a mounting plate for mounting the air hose hanger to a coupler of a rail car, the mounting plate including first and second apertures for receiving first and second bolts for attaching the mounting plate to the coupler;
    an arm removably attached to the head, the arm comprising:
        a first arm removably attached to the head and extending in a substantially vertical direction away from the head; and
        a second arm integral with the first arm and extending in a horizontal direction substantially parallel to an axis of the coupler;
    first and second inserts received in first and second lightener holes which are preformed in the coupler, the first and second lightener holes extending from a front opening in the coupler to a rear opening in the coupler,
    wherein the front opening is larger than the rear opening, and wherein the first and second inserts are sized such that they are received in the front opening and are displaceable in the first and second lightener holes, but are larger than the rear openings such that they cannot pass there through, and
    wherein the first and second inserts are disposed in the lightener holes adjacent the rear openings and each include a threaded aperture for receiving the first and second bolts, respectively, for securing the head of the hanger to the coupler.

2. The air hose hanger of claim 1, further comprising a hose connection rotatably attached to an end of the second arm for rotatably supporting a flexible air hose attached to the hose connection.

3. The air hose hanger of claim 2, wherein the end of the second arm includes a hollow cylindrical member configured for receiving a cylindrical member of the hose connection, wherein the cylindrical member of the hose connection is attached to the hollow cylindrical member for rotatable movement of the hose connection with respect to the hollow cylindrical member.

4. The air hose hanger of claim 1, further comprising an extension extending from the head in a direction generally away from the second arm, the extension including an aperture configured for alignment with an aperture preformed in an underside of the coupler and attached to the coupler via a bolt passing through both apertures.

5. The air hose hanger of claim 1, where the first and second arms include a "+" or "x" shaped cross-section.

6. The air hose hanger of claim 1, wherein the rail car comprises a cushioned car, and wherein the coupler comprises a cushioned coupler.

7. The air hose hanger of claim 1, wherein the head and the first and second arms are comprised of ductile iron, heat treated ductile iron, or austempered ductile iron or steel for weldable designs.

8. An air hose hanger for supporting flexible air hoses of a trainline braking system of a rail car, the air hose hanger comprising:
    a head including a mounting plate for mounting the air hose hanger to a coupler of a rail car, the mounting plate including first and second apertures for receiving first and second bolts for attaching the mounting plate to the coupler;
    an arm removably attached to the head, the arm comprising:
        a first arm removably attached to the head and extending in a substantially vertical direction away from the head; and
        a second arm integral with the first arm and extending in a horizontal direction substantially parallel to an axis of the coupler;
    wherein the head is attached to the coupler at three preformed holes formed in the coupler, the three preformed holes comprised of first and second lightener holes preformed in the coupler, and a third aperture preformed in a tab on an underside of the coupler.

9. The air hose hanger of claim 8, further comprising:

first and second inserts received in the first and second lightener holes which are preformed in the coupler, the first and second lightener holes extending from a front opening in the coupler to a rear opening in the coupler, wherein the front opening is larger than the rear opening, and wherein the first and second inserts are sized such that they are received in the front opening and are displaceable in the first and second lightener holes, but are larger than the rear openings such that they cannot pass there through, and wherein the first and second inserts are disposed in the lightener holes adjacent the rear openings and each include a threaded aperture for receiving the first and second bolts, respectively, for securing the head of the hanger to the coupler.

10. The air hose hanger of claim 9, further comprising an extension extending from the head in a direction generally away from the second arm, the extension including an aperture configured for alignment with the third aperture preformed in the underside of the coupler and attached to the coupler via a bolt passing through both apertures.

11. The air hose hanger of claim 8, further comprising a hose connection rotatably attached to an end of the second arm for rotatably supporting a flexible air hose attached to the hose connection.

12. The air hose hanger of claim 11, wherein the end of the second arm includes a hollow cylindrical member configured for receiving a cylindrical member of the hose connection, wherein the cylindrical member of the hose connection is attached to the hollow cylindrical member for rotatable movement of the hose connection with respect to the hollow cylindrical member.

13. The air hose hanger of claim 8, where the first and second arms include a "+" or "x" shaped cross-section.

14. The air hose hanger of claim 8, wherein the rail car comprises a cushioned car, and wherein the coupler comprises a cushioned coupler.

15. The air hose hanger of claim 8, wherein the head and the first and second arms are comprised of ductile iron, heat treated ductile iron, or austempered ductile iron or steel for weldable designs.

* * * * *